(12) United States Patent
Uhlik

(10) Patent No.: US 10,085,439 B1
(45) Date of Patent: Oct. 2, 2018

(54) CASINO MENTALITY HOG TRAP

(71) Applicant: Matthew J. Uhlik, Greenleaf, KS (US)

(72) Inventor: Matthew J. Uhlik, Greenleaf, KS (US)

( * ) Notice: Subject to any disclaimer, the term of this patent is extended or adjusted under 35 U.S.C. 154(b) by 0 days.

(21) Appl. No.: 15/920,837

(22) Filed: Mar. 14, 2018

Related U.S. Application Data

(60) Provisional application No. 62/627,320, filed on Feb. 7, 2018.

(51) Int. Cl.
| | | |
|---|---|---|
| *A01M 23/06* | (2006.01) | |
| *A01M 23/20* | (2006.01) | |
| *A01M 23/08* | (2006.01) | |
| *A01M 23/14* | (2006.01) | |
| *A01K 5/02* | (2006.01) | |
| *B60P 3/04* | (2006.01) | |
| *B62D 63/08* | (2006.01) | |
| *A01M 31/00* | (2006.01) | |

(52) U.S. Cl.
CPC ............. *A01M 23/06* (2013.01); *A01K 5/025* (2013.01); *A01M 23/08* (2013.01); *A01M 23/14* (2013.01); *A01M 23/20* (2013.01); *A01M 31/008* (2013.01); *B60P 3/04* (2013.01); *B62D 63/08* (2013.01); *A01M 2200/00* (2013.01)

(58) Field of Classification Search
CPC ...... A01M 23/00; A01M 23/02; A01M 23/04; A01M 23/06; A01M 23/08; A01M 23/12; A01M 23/14; A01M 23/16; A01M 23/18; A01M 23/20; A01M 2200/00; A01M 31/008; A01K 5/025; B60P 3/04; B62D 63/08
See application file for complete search history.

(56) References Cited

U.S. PATENT DOCUMENTS

| | | | | |
|---|---|---|---|---|
| 223,324 A | * | 1/1880 | Driscoll | A01M 21/00 43/70 |
| 1,217,056 A | * | 2/1917 | Pickering | A01M 21/00 43/70 |
| 1,600,347 A | * | 9/1926 | Martin | A01M 23/00 43/70 |
| 1,668,367 A | * | 5/1928 | Hentschel | A01M 23/06 43/70 |
| 1,810,608 A | | 6/1931 | Jacobs | |
| 2,052,823 A | | 9/1936 | Hagermann | |
| 2,056,882 A | | 10/1936 | Appiani | |

(Continued)

*Primary Examiner* — Kathleen I Alker
(74) *Attorney, Agent, or Firm* — Jeffrey L. Thompson; Thompson & Thompson, P.A.

(57) ABSTRACT

A casino mentality hog trap assembly is built into a trailer having a frame supported by a plurality of wheels, a hitch for attaching to a towing vehicle, and a platform. A hinged trap floor is located in the platform and is moveable between a horizontal closed position and a downwardly inclined open position for causing animals to fall into a holding pen. A plurality of feeder stations are positioned adjacent to the trap floor. The feeder stations each have feeder lids that can be raised by animals to access feed contained in feeder troughs. A trigger mechanism is arranged to be tripped when two of the feeder lids are raised at the same time. A scent roller is also positioned adjacent to the trap floor and is connected to the trigger mechanism by a linkage that causes the trigger mechanism to be tripped when the scent roller is lifted.

21 Claims, 9 Drawing Sheets

(56) References Cited

U.S. PATENT DOCUMENTS

| | | | | |
|---|---|---|---|---|
| 2,156,213 | A * | 4/1939 | White | A01M 23/00 |
| | | | | 43/76 |
| 2,163,577 | A | 6/1939 | Allen | |
| 2,250,347 | A | 7/1941 | Been | |
| 2,671,980 | A | 3/1954 | Lundquist | |
| 2,763,092 | A | 9/1956 | Sheridan | |
| 3,039,434 | A * | 6/1962 | Kalata | A01K 5/025 |
| | | | | 119/52.4 |
| 3,423,870 | A * | 1/1969 | Kost | A01M 23/04 |
| | | | | 43/69 |
| 4,080,749 | A * | 3/1978 | Gilbaugh | A01M 23/16 |
| | | | | 43/61 |
| 6,088,948 | A * | 7/2000 | Rønnau | A01M 23/02 |
| | | | | 43/64 |
| 6,772,555 | B2 | 8/2004 | Evans et al. | |
| 8,336,250 | B2 | 12/2012 | Kelley | |
| 8,438,777 | B2 | 5/2013 | Uhlik | |
| 9,980,476 | B2 * | 5/2018 | Miyawaki | A01M 23/18 |
| 2016/0183494 | A1 * | 6/2016 | Wammock | A01K 5/025 |
| | | | | 119/55 |
| 2017/0142929 | A1 * | 5/2017 | Poche | A01K 5/02 |
| 2018/0077919 | A1 * | 3/2018 | McNew | A01K 3/00 |
| 2018/0098532 | A1 * | 4/2018 | Poche | A01K 5/02 |

\* cited by examiner

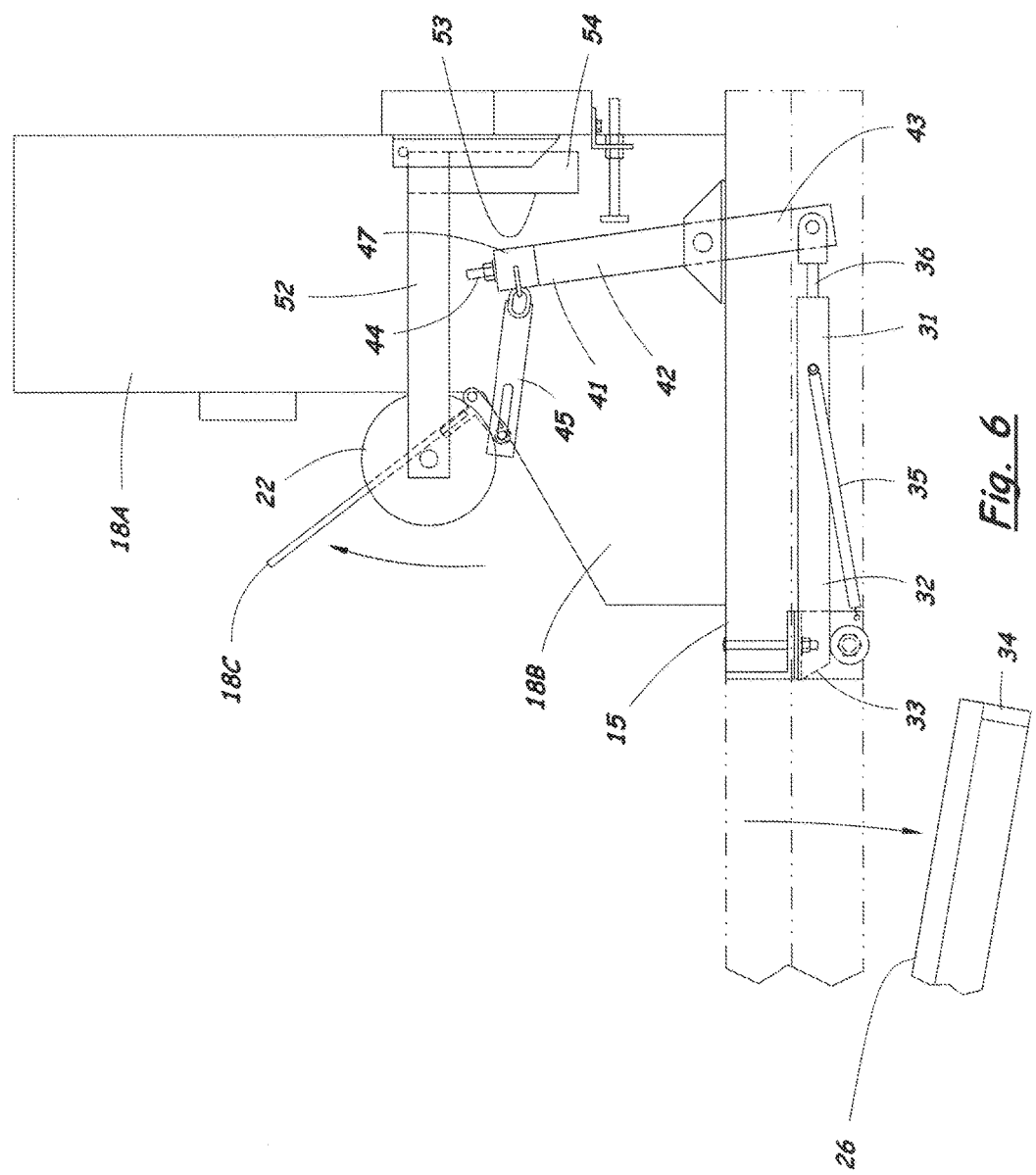

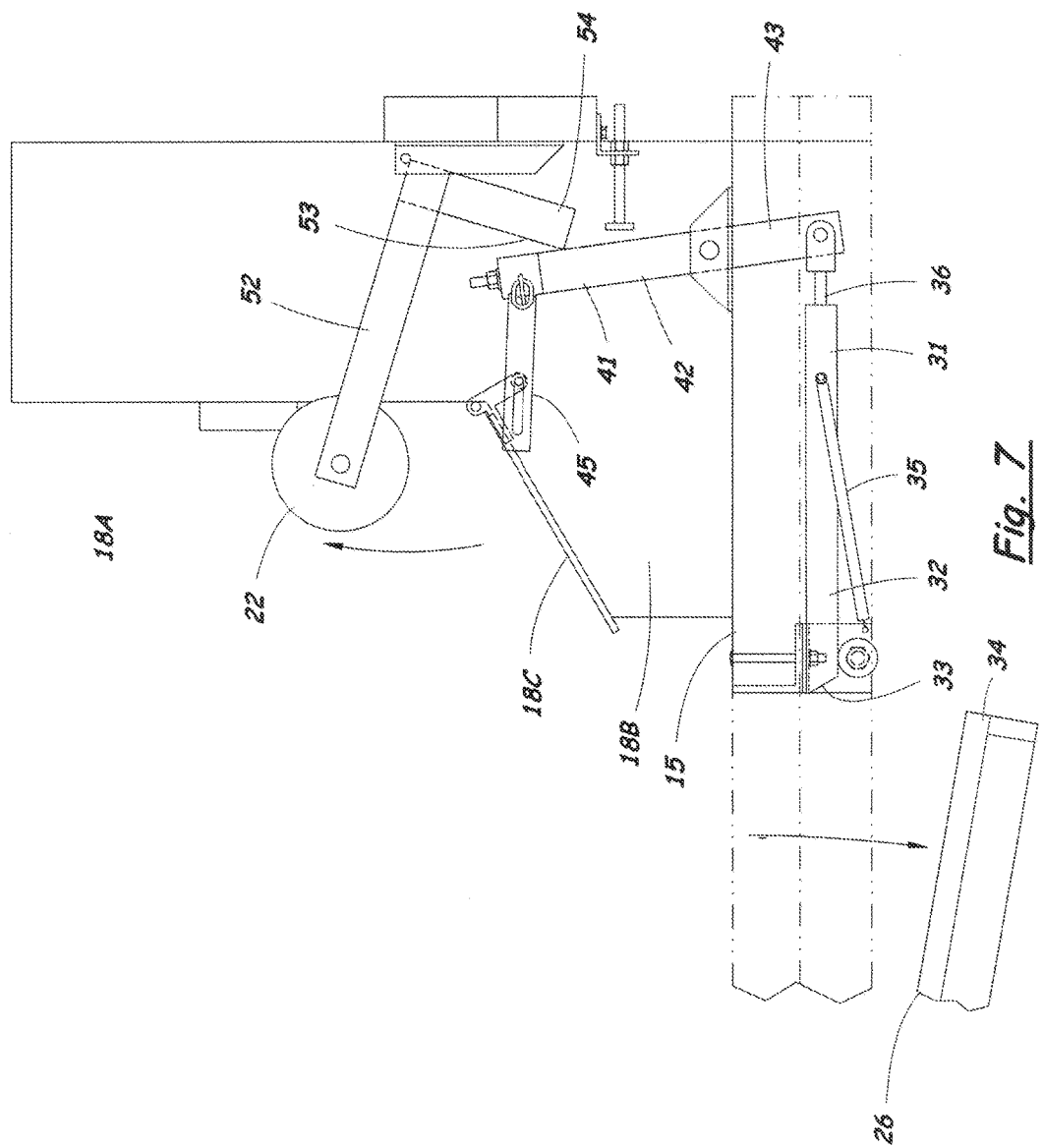

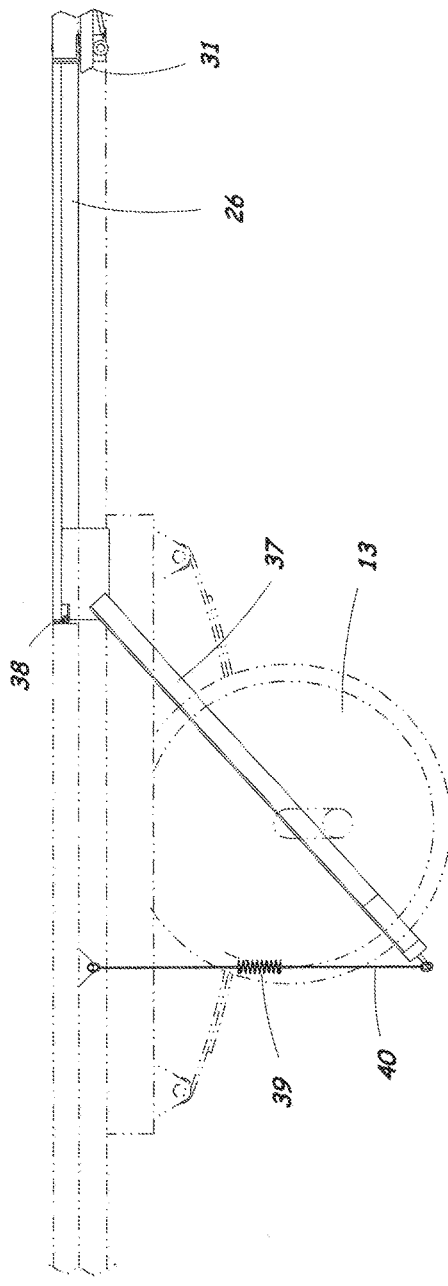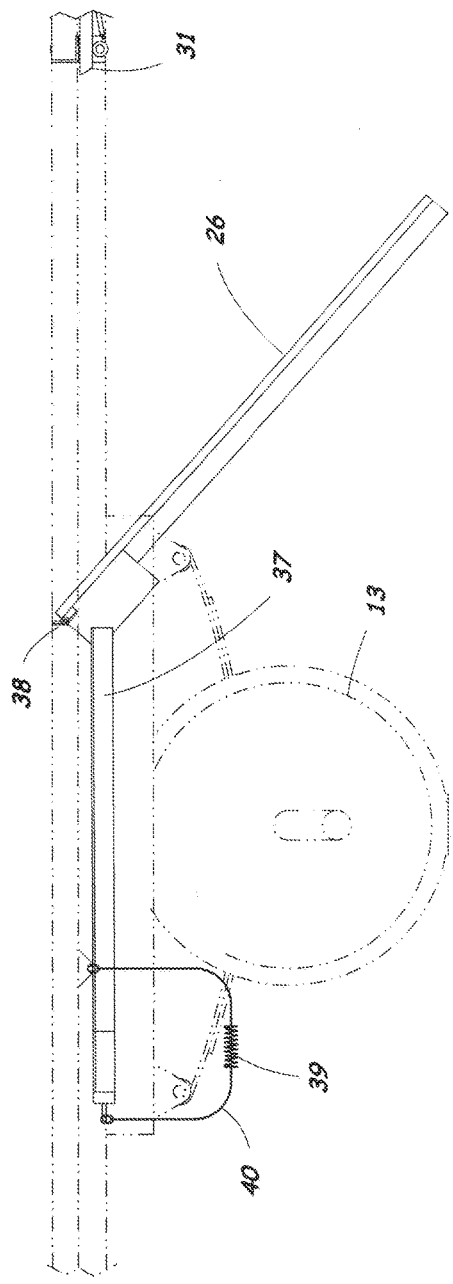

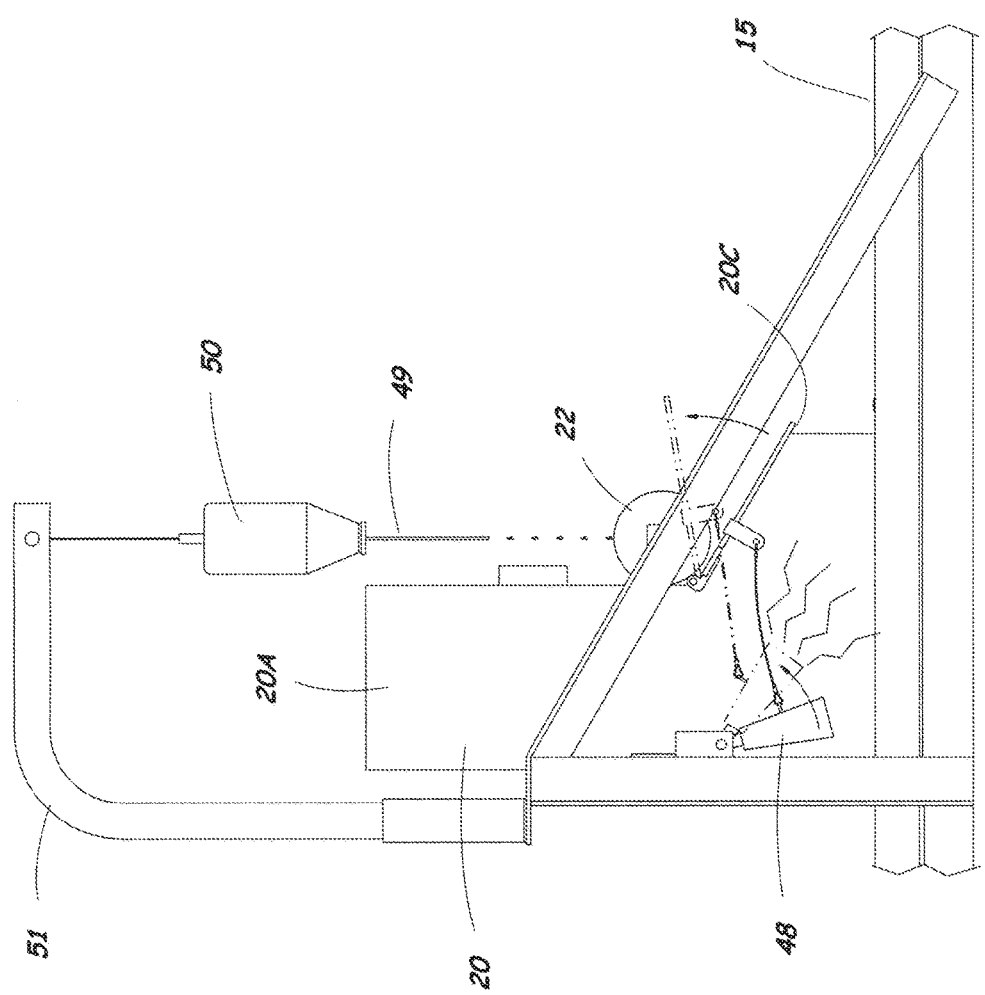

CASINO MENTALITY HOG TRAP

RELATED APPLICATION

This application claims the benefit of U.S. Provisional Patent Application No. 62/627,320 filed on Feb. 7, 2018. The entire content of this related application is incorporated herein by reference.

BACKGROUND OF THE INVENTION

Field of the Invention

The present invention relates generally to methods and systems for catching wild hogs and, in particular, to a repeating trap assembly for catching multiple hogs.

Description of the Related Art

Wild hogs have become a big problem in the United States. They disrupt native vegetation, claim food set out for livestock, and harm livestock and other wildlife. In state and national parks, wild hogs tear up recreational areas and landscaping, and terrorize people. Wild hogs also devour or destroy agricultural fields, causing millions in damages every year.

Controlling wild hogs is a goal in several southern states. Hunters kill many wild hogs using firearms and bow and arrow hunting. Efforts have also been made to trap wild hogs to help control the population. However, the wild hog population continues to grow.

Wild hogs are skittish and difficult to entice into a trap, particularly when trying to catch animals that have already been educated by exposure to conventional trapping methods.

There is a need for an improved trap to catch wild hogs.

SUMMARY OF THE INVENTION

An object of the present invention is to provide a casino mentality trap that can be used effectively to catch wild hogs.

A further object of the present invention is to provide a hog trap that has decoy feeders to attract hogs to the trap site, and other features to get all of the hogs in a family group conditioned to entering and leaving the trap unharmed.

A further object of the present invention is to provide a hog trap that is not triggered by lifting individual feeder lids, but is triggered by lifting two feeder lids at the same time.

A further object of the present invention is to provide a hog trap that resets itself automatically after animals fall through a trap floor.

A further object of the present invention is to provide a hog trap having a scent roller that can be lifted by an animal to trigger the trap floor to open.

A further object of the present invention is to provide a repeating hog trap on a wheeled trailer that can be towed to a trap site for convenient transport and setup.

A further object of the present invention is to provide a repeating hog trap with multiple hopper-style feeders, a scent roller, a spinner-style feeder to scatter feed, and an oiler to attract animals to the feeder.

To accomplish these and other objects of the invention, a casino mentality repeating hog trap assembly is built into a trailer having a frame supported by a plurality of wheels, a hitch for attaching to a towing vehicle, and a platform. A hinged trap floor is located in the platform and is moveable between a horizontal closed position and a downwardly inclined open position for causing animals to fall into a holding pen. A plurality of feeder stations are positioned adjacent to the trap floor. The feeder stations each have feeder lids that can be raised by animals to access feed contained in feeder troughs. A trigger mechanism is arranged to be tripped when two of the feeder lids are raised at the same time. A scent roller is also positioned adjacent to the trap floor and is connected to the trigger mechanism by a linkage that causes the trigger mechanism to be tripped when the scent roller is lifted. A one-way gate assembly is positioned between the trap floor and the holding pen to allow animals to enter the holding pen while preventing animals in the holding pen from getting out.

According to one aspect of the invention, a repeating trap assembly is provided, comprising: a platform having a trap floor rotatably moveable between a generally horizontal closed position and a downwardly inclined open position, the trap floor being biased toward the closed position; a first feeder station positioned adjacent to the trap floor, the first feeder station comprising a first hopper for containing feed, a first trough for receiving feed from the first hopper, and a first lid covering the first trough that can be raised by an animal to access feed contained in the first trough; a second feeder station positioned adjacent to the trap floor, the second feeder station comprising a second hopper for containing feed, a second trough for receiving feed from the second hopper, and a second lid covering the second trough that can be raised by an animal to access feed contained in the second trough; and a mechanical trigger mechanism arranged to be tripped by movement of the first and second lids for releasing the trap floor to move from the closed position to the downwardly inclined open position.

According to another aspect of the present invention, a repeating trap assembly is provided, comprising: a trailer having a frame supported by a plurality of wheels, a hitch for attaching to a towing vehicle, and a platform; a hinged trap floor located in the platform, the trap floor being rotatably moveable between a generally horizontal closed position and a downwardly inclined open position, the trap floor being biased toward the closed position; a holding pen for containing animals that have fallen through the trap floor of the trap assembly; a first feeder station positioned adjacent to the trap floor, the first feeder station comprising a first hopper for containing feed, a first trough for receiving feed from the first hopper, and a first lid covering the first trough that can be raised by an animal to access feed contained in the first trough; a second feeder station positioned adjacent to the trap floor, the second feeder station comprising a second hopper for containing feed, a second trough for receiving feed from the second hopper, and a second lid covering the second trough that can be raised by an animal to access feed contained in the second trough; and a mechanical trigger mechanism arranged to be tripped by movement of the first and second lids for releasing the trap floor to move from the closed position to the downwardly inclined open position.

Numerous other objects of the present invention will be apparent to those skilled in this art from the following description wherein there is shown and described an embodiment of the present invention, simply by way of illustration of one of the modes best suited to carry out the invention. As will be realized, the invention is capable of other different embodiments, and its several details are capable of modification in various obvious aspects without departing from the invention. Accordingly, the drawings and description should be regarded as illustrative in nature and not restrictive.

BRIEF DESCRIPTION OF THE DRAWINGS

The present invention will become more clearly appreciated as the disclosure of the present invention is made with reference to the accompanying drawings. In the drawings:

FIGS. 6 and 7 are detail views of the trigger mechanism for the trap assembly of the present invention, with FIG. 6 showing the trigger assembly in a released position upon lifting multiple feeder lids to activate the trigger assembly; and FIG. 7 showing the trigger assembly in a released position upon lifting a scent roller to activate the trigger assembly.

FIGS. 8 and 9 are detail views of a trap door for the trap assembly;

FIG. 8 shows the trap door in a horizontal latched condition; and

FIG. 9 shows the trap door in a downwardly sloped unlatched condition after the trigger assembly is released.

FIG. 10 is a detail side elevation view of the trap assembly showing a dripper for dripping scent oil on the scent roller, and a bell connected to one of the feeder lids to create noise for conditioning the animals to not be afraid of sounds made by the trap assembly.

DETAILED DESCRIPTION OF THE INVENTION

Figure 1:
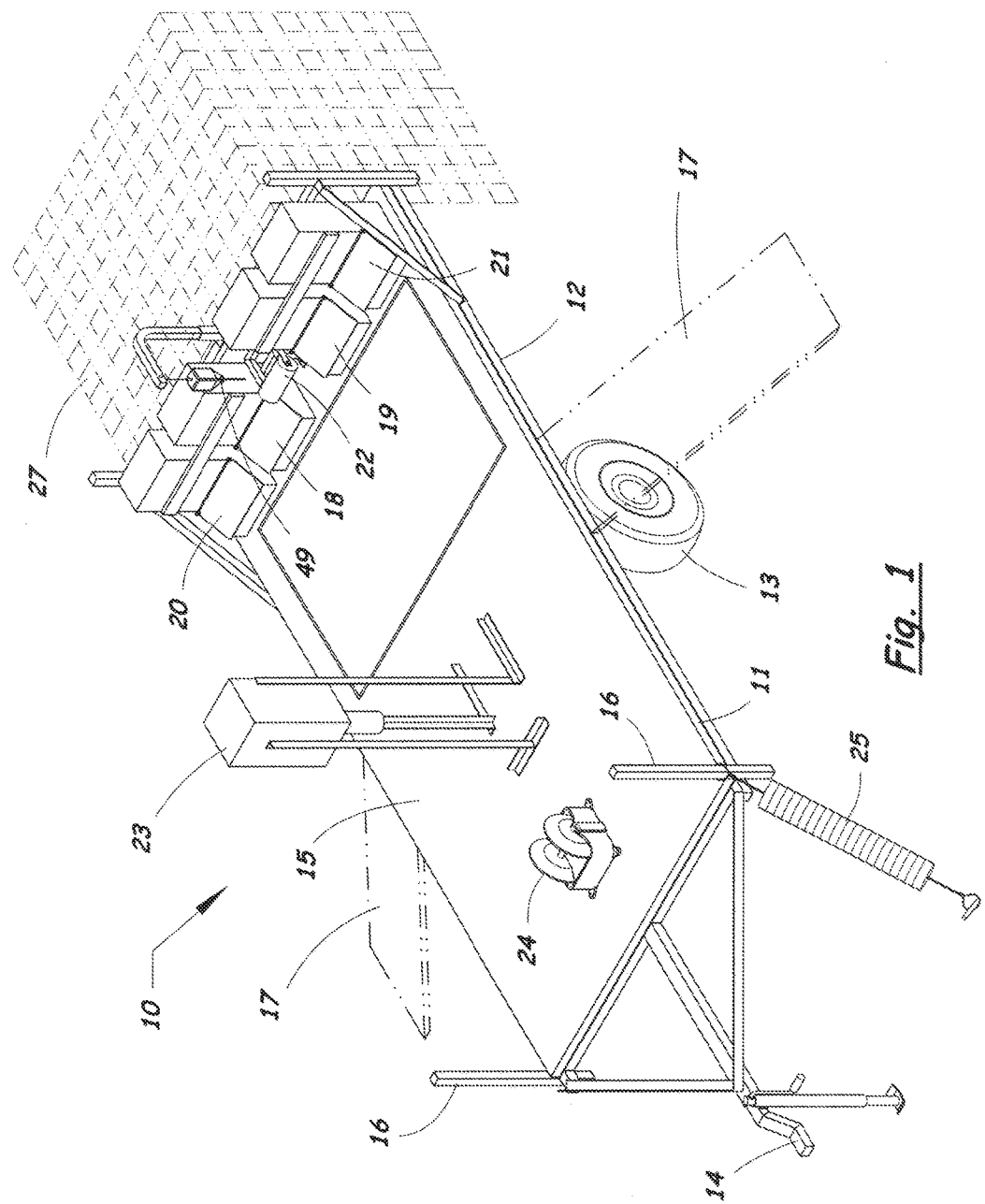
FIG. 1 is a perspective view of a casino mentality repeating trap assembly according to the present invention.
Figure 2:
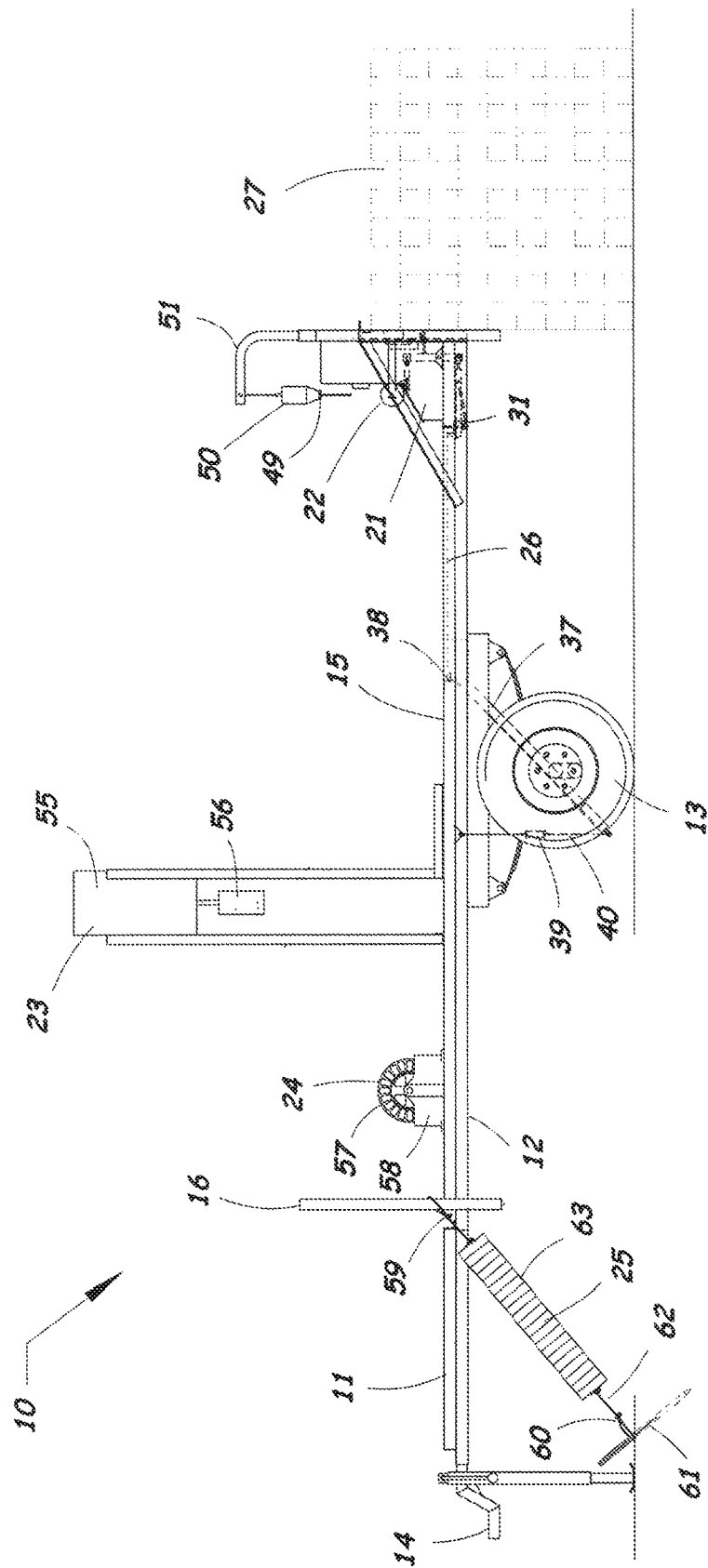
FIG. 2 is a side elevation view of the trap assembly shown in FIG. 1.

A casino mentality repeating trap assembly 10 for trapping hogs according to the present invention will now be described in detail with reference to FIGS. 1 to 10 of the accompanying drawings.

The trap assembly 10 of the present invention is described as a "casino mentality" trap because it offers ample free food, entertainment (e.g., fun noises, scents, oilers, relaxation, scratching, etc.), and gambling. The animals are attracted to the food and entertainment, and the animals gamble with their safety and freedom because they want to continue enjoying the food and entertainment. The unique triggering mechanism prevents the animals from understanding or predicting what behavior will trigger the trap, thereby making the animals gamble each time they raise a feeder lid or other triggering element.

The trap assembly 10 is built integral with a transport trailer 11 for convenience and efficiency in transporting the trap assembly 10 to a trap site. The trailer 11 includes a frame 12 supported by a plurality of wheels 13, a front hitch 14 for attaching the trailer 11 to a towing vehicle, and a platform 15. A plurality of support stands 16 can be provided at the corners of the trailer 11 to stabilize the platform 15 against rocking or tilting movement as animals move on and off the platform 15.

The platform 15 provides a substantially flat surface on which animals can walk to access various features of the trap assembly 10. Ramps or walkways 17 are provided on each side of the trailer 11 to allow animals to walk onto and off of the platform 15.

A bank of feeder stations 18-21 is provided at the rear of the trailer 11, and a scent roller 22 is located between two of the feeder stations 18, 19. A spinner-type feeder 23, a first rotating oiler 24, and a second rotating oiler 25 are positioned near the front of the platform 15. These various features of the trap assembly 10 will be explained in more detail below.

A hinged trap floor 26 is located in the platform 15 between the bank of feeder stations 18-21 and the spinner-type feeder 23. The trap floor 26 is rotatably moveable between a generally horizontal closed position, as shown in FIGS. 1 to 4 and 8, and a downwardly inclined open position, as shown in FIGS. 6, 7 and 9. A holding pen 27 is erected around the rear of the trailer 11 after the trailer 11 is parked at the trap site, as illustrated in FIG. 1. The holding pen 27 provides a place to contain animals that fall through the trap floor of the trap assembly. The holding pen 27 can be, for example, a cube-shaped cage created by livestock gate panels with an entrance to the cage located adjacent to the rear of the trailer 11, and an access opening in a rear or sidewall for removing captured animals from the trap assembly 10.

Figure 3:
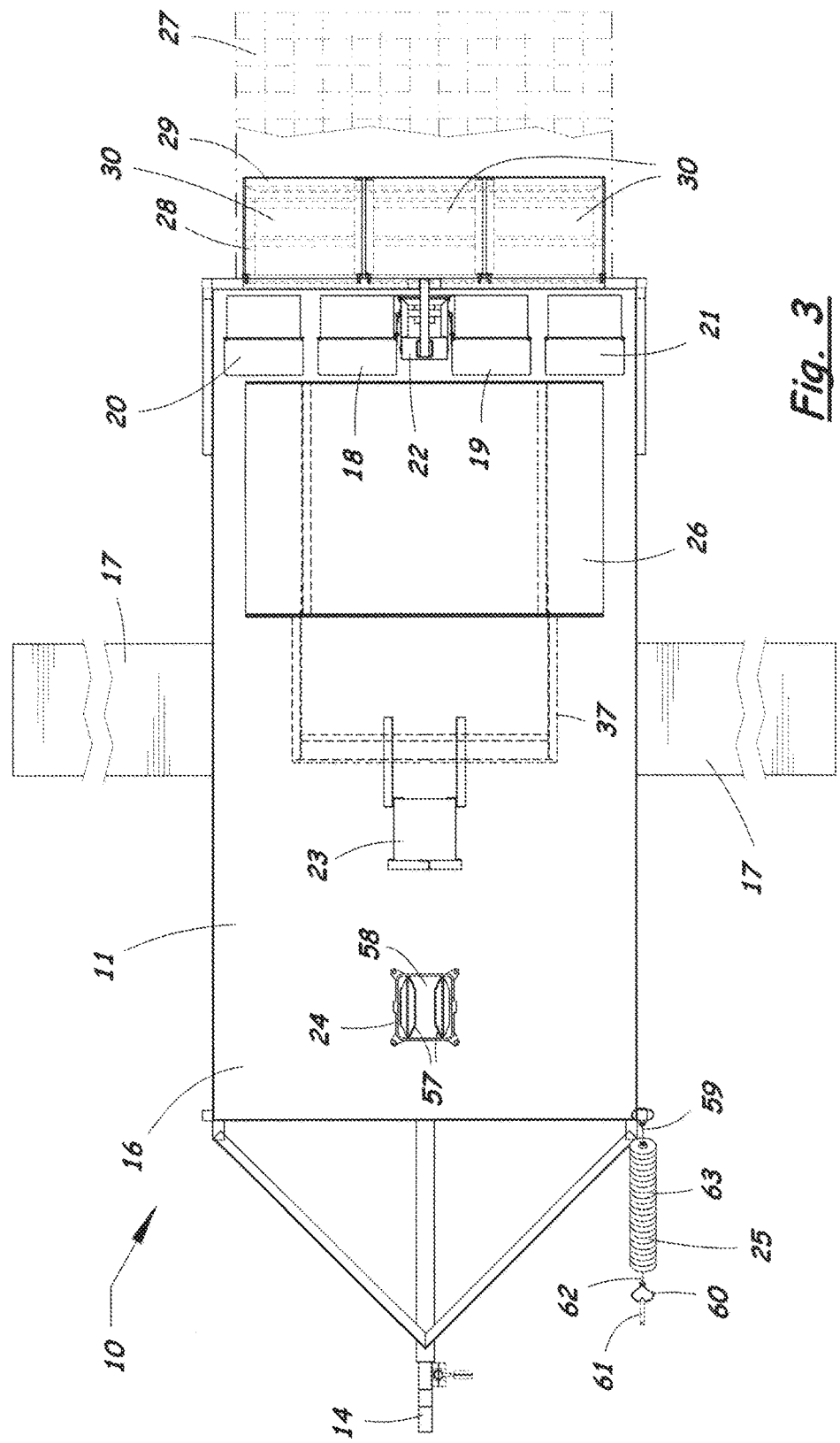
FIG. 3 is a plan view of the trap assembly shown in FIG. 1.
Figure 4:
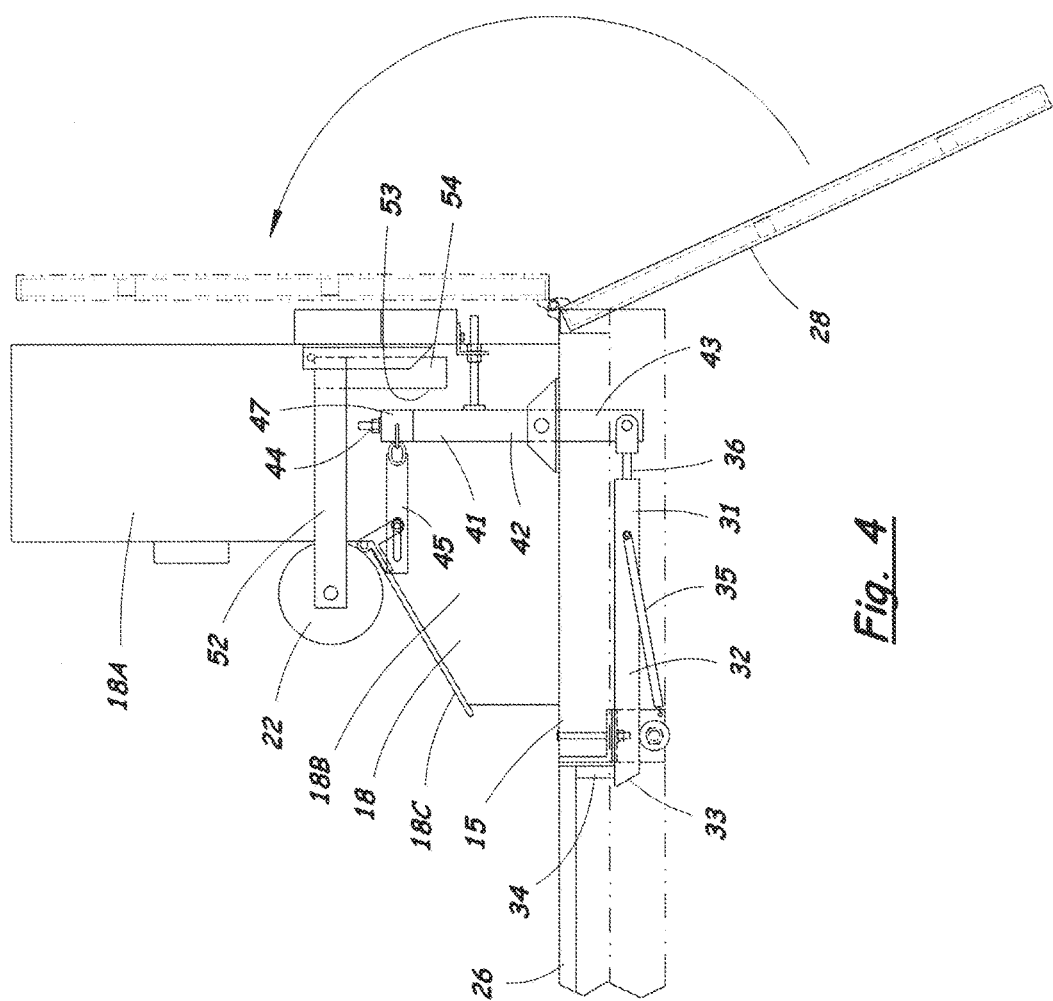
FIG. 4 is a detail elevation view showing a trigger mechanism for the trap in a latched condition, and a one-way gate assembly located at the entrance to a holding pen.
Figure 5:
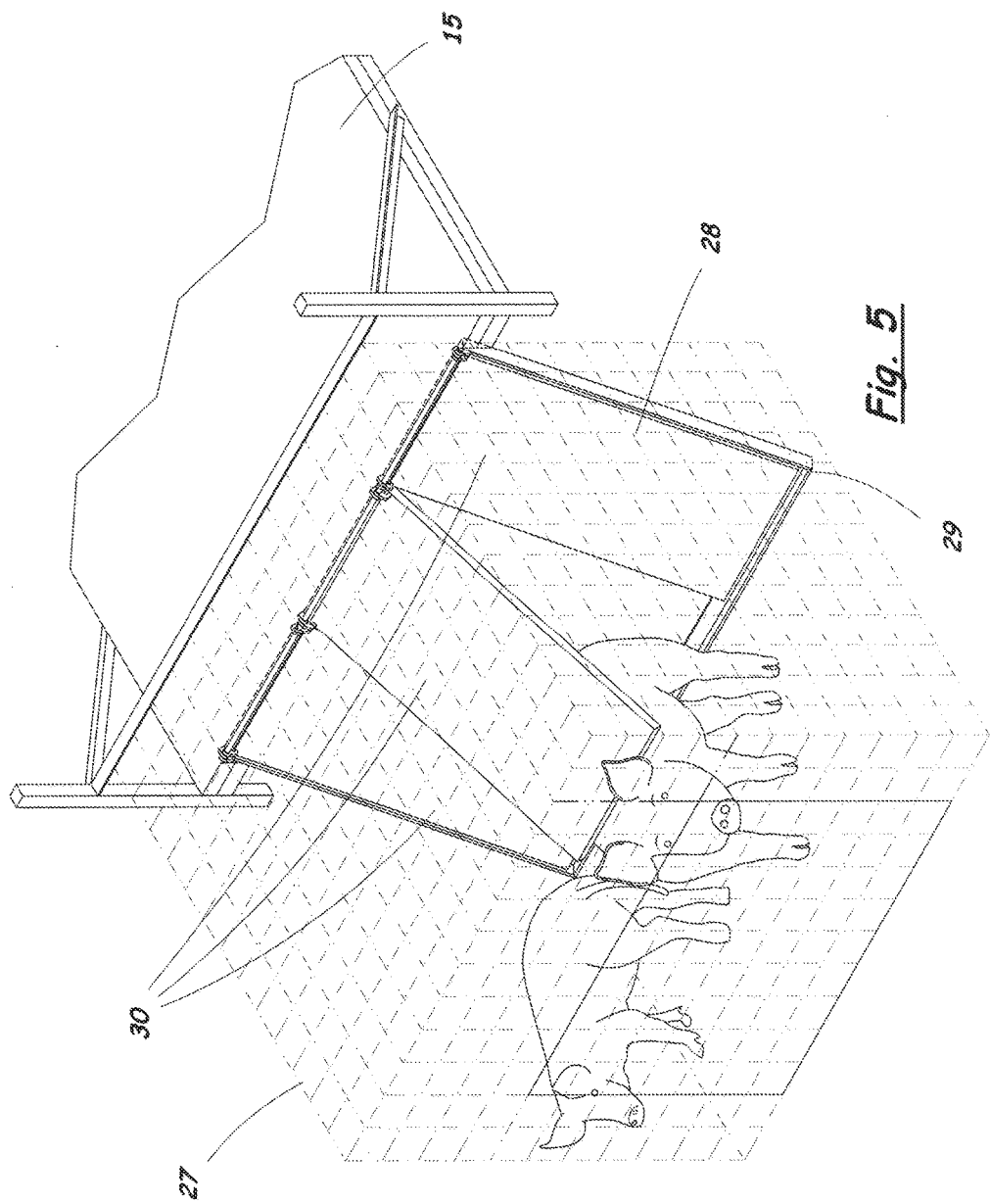
FIG. 5 is a detail perspective view showing additional details of the one-way gate assembly located at the entrance to the holding pen.

As illustrated in FIGS. 3, 4 and 5, a one-way gate assembly 28 can be attached under the trailer platform 15 to help guide animals into the holding pen 27. The one-way gate assembly 28 is pivotally mounted to the trailer 11 near the rear of the platform 15. The one-way gate assembly 28 includes a rectangular frame 29 that extends substantially across the width of the trailer 11, and a plurality of individually mounted gate panels 30 (e.g., two to six gate panels) arranged side-by-side within the rectangular frame 29. The frame 29 and gate panels 30 are pivotally attached to the rear of the trailer 11 and have a first deployed position in which the frame 29 and gate panels 30 extend downwardly and rearwardly from the rear of the trailer 11, as illustrated in FIGS. 4 and 5. The frame 29 and gate panels 30 can be pivoted as a single unit to a second transport position in which the frame 29 and gate panels 30 extend generally vertically above the trailer platform 15 for transport, as illustrated in dashed lines in FIG. 4.

The one-way gate assembly 28 is placed in its first deployed position at the trap site. When an animal falls through the trap floor 26, the animal can easily push through one of the gate panels 30 to enter the holding pen 27, as illustrated in FIG. 5. When the animal pushes against the gate panel 30, the gate panel 30 pivots upwardly about its mounting axis until the animal passes through, and then the gate panel 30 falls back into its deployed position to prevent other animals in the holding pen 27 from escaping from the holding pen 27.

The trap floor 26 is held in its horizontal closed position by a mechanical trigger mechanism 31. The trigger mechanism 31 has a locking element 32 with a bevel face 33 for engaging an edge 34 of the trap floor 26 as the trap floor 26 moves from its downwardly inclined open position to its horizontal closed position. The locking element 32 is spring biased toward a locked position by a spring 35. The bevel face 33 is arranged to cause the locking element 32 to move axially and reset the trigger mechanism 31 automatically when the trap floor 26 is moved to its closed position. The locking element 32 can include a threaded link assembly 36 that allows its length to be adjusted to adjust the triggering force and triggering displacement needed to trip the trigger mechanism 31.

A counterweight extension 37 is attached to the trap floor 26 behind the pivot point 38 to bias the trap floor 26 back to its closed position. A spring 39 and flexible cable 40 can be attached to the counterweight extension 37 to serve as a stop limit for the trap floor 26 when it pivots to its closed position. The spring 39 and flexible cable 40 can also be arranged to bias the trap floor 26 toward its closed position or toward its downwardly inclined open position.

The bank of feeder stations 18-21 includes first and second feeder stations 18, 19 positioned adjacent to the trap floor 26. The first feeder station 18 has a first hopper 18A for containing feed, a first trough 18B for receiving feed from the first hopper 18A, and a first lid 18C covering the first trough 18B. The first lid 18C can be raised by an animal to access feed contained in the first trough 18B.

The second feeder station 19 has a second hopper 19A for containing feed, a second trough 19B for receiving feed from the second hopper 19A, and a second lid 19C covering the second trough 19B. The second lid 19C can be raised by an animal to access feed contained in the second trough 19B.

The mechanical trigger mechanism 31 is arranged to be tripped by movement of the first and second lids 18C, 19C of the first and second feeder stations 18, 19 for releasing the trap floor 26 to move from its closed position to its downwardly inclined open position. The trigger mechanism 31 includes a lost motion linkage 41 that allows the first and second lids 18C, 19C to be raised individually without tripping the trigger mechanism 31, while causing the trigger mechanism 31 to be tripped when both of the first and second lids 18C, 19C are raised at the same time.

The lost motion linkage 41 includes a first link member 42 pivotally connected to the platform 15. A lower end 43 of the first link member 42 is pivotally attached to the locking element 32. An upper end 44 of the first link member 42 is attached by respective lost motion link assemblies 45 to the first and second feeder lids 18C, 19C. A pivotal coupling 47 provided at the upper end 44 of the first link member 42 connects the first link member 42 to the lost motion link assemblies 45.

The first feeder station 18 is spaced from the second feeder station 19 with the scent roller 22 located between the first and second feeder stations 18, 19. The trigger mechanism 31 requires multiple animals to be present on the trap floor 26 by requiring the first and second lids 18C, 19C to be raised at the same time before the trigger mechanism 31 will be tripped. With multiple animals standing on the trap floor 26 when the trap floor 26 moves from its horizontal closed position to its downwardly inclined open position, multiple animals will be captured by the trap assembly 10 with each triggering of the trigger mechanism 31.

The bank of feeder stations includes third and fourth feeder stations 20, 21 positioned beside the first and second feeder stations 18, 19, respectively. The third and fourth feeder stations 20, 21 both have hoppers 20A, 21A, troughs 20B, 21B, and lids 20C, 21C similar to the first and second feeder stations 18, 19. However, the lids 20C, 21C of the third and fourth feeder stations 20, 21 are not connected to the trigger mechanism 31. Thus, animals can eat from the third and fourth feeder stations 20, 21 individually or simultaneously without triggering the trap assembly 10. And animals can eat from the first and second feeder stations 18, 19 one at a time without triggering the trap assembly 10. The trap assembly 10 also may include a bell 48 connected to one of the feeder lids 20C to create additional noise to help condition animals not to fear metallic sounds made by the trap assembly 10. These features allow animals to become accustomed to using the feeder stations 18-21 without harm, thereby conditioning the animals to use the feeder stations 18-21 without fear of being captured.

The scent roller 22 is arranged between the first and second feeder stations 18, 19. A dripper assembly 49 is located above the scent roller 22 for dripping scented oil onto the scent roller 22 from a container 50 of such oil. For example, the dripper assembly 49 can be suspended from a hanger bracket 51 above the scent roller 22. The scented oil can be a scent lure, such as sow-in-heat liquid or other attractant that brings animals to the trap site and/or encourages aggressive behavior that leads to triggering the trap assembly 10.

The scent roller 22 is supported by a mounting assembly 52 that allows the scent roller 22 to rotate about its own axis, and to be lifted (e.g., by an animal nosing under the roller 22 and lifting). The mounting assembly 52 has a structure 53 that engages the linkage 41 to cause the trigger mechanism 31 to be tripped upon an animal lifting the scent roller 22. The structure 53 includes an arm 54 that extends from the mounting assembly 52 and moves when the scent roller 22 is lifted. The arm 54 is arranged to engage the first link member 42 to cause the first link member 42 to rotate and move the locking element 32 when the scent roller 22 is lifted. An animal can nose the scent roller 22 to rotate the scent roller 22 about its own axis without tripping the trigger mechanism 31. However, once the animal lifts the scent roller 22, the trigger mechanism 31 will be tripped and the trap floor 26 will be released to move from its horizontal closed position to its downwardly inclined open position.

The spinner-type feeder 23 has a feed container 55 and a timer-controlled spinner mechanism 56. The spinner mechanism 56 can be set to rotate and scatter feed at timed intervals to spread a small amount of feed over the trap floor 26 and the area surrounding the trap assembly 10. The scattered feed will help attract animals to the trap assembly 10.

The first oiler 24 is located on the platform 15 near the front of the trailer 11. The first oiler 24 has at least one rotating wheel 57 that can be rotated by an animal through a tub 58 containing liquid to dispense a liquid attractant to the animal to help attract animals to the trap assembly 10. For example, the liquid attractant can be mineral oil or other oils typically used in livestock oilers.

The second oiler 25 has an upper end 59 attached to one of the support stands 16 at a front corner of the trailer 11, and a lower end 60 anchored to the ground by a stake 61 driven into the ground. The second oiler 25 comprises a central member 62, such as a rod or flexible cable, and a plurality of cylindrical members 63 arranged to pivot on the central member 62. For example, the cylindrical members 63 can be segments of a wooden post or wooden telephone pole with grooves cut into the outer surface of the cylindrical members 63. Creosote or other types of oil can be poured over the cylindrical members 63 to help attract animals to the trap site.

Animals will use the second oiler 25 by rubbing against the cylindrical members 63 to satisfy an urge to scratch (especially if the animals are infested with lice and ticks). The second oiler 25 thus provides additional entertainment and encourages animals to relax and stay at the "casino" trap site.

While the invention has been described in connection with specific embodiments thereof, it is to be understood that this is by way of illustration and not of limitation, and the scope of the appended claims should be construed as broadly as the prior art will permit.

What is claimed is:

1. A casino mentality repeating trap assembly, comprising a platform having a trap floor rotatably moveable between a generally horizontal closed position and a downwardly inclined open position, said trap floor being biased toward said closed position;
a first feeder station positioned adjacent to said trap floor, said first feeder station comprising a first hopper for containing feed, a first trough for receiving feed from said first hopper, and a first lid covering said first trough that can be raised by an animal to access feed contained in said first trough;
a second feeder station positioned adjacent to said trap floor, said second feeder station comprising a second hopper for containing feed, a second trough for receiving feed from said second hopper, and a second lid covering said second trough that can be raised by an animal to access feed contained in said second trough; and
a mechanical trigger mechanism arranged to be tripped by movement of said first and second lids for releasing said trap floor to move from said closed position to said downwardly inclined open position.

2. The repeating trap assembly according to claim 1, wherein said mechanical trigger mechanism comprises a locking element having a bevel face for engaging an edge of said trap floor as said trap floor moves from said open position to said closed position, said locking element being spring biased toward a locked position, and said bevel face being arranged to cause said locking element to move axially and reset said trigger mechanism automatically when said trap floor is moved to said closed position.

3. The repeating trap assembly according to claim 2, wherein said mechanical trigger mechanism comprises a lost motion linkage that allows said first and second lids to be raised individually without tripping said trigger mechanism, while causing said trigger mechanism to be tripped when both said first and second lids are raised at the same time.

4. The repeating trap assembly according to claim 3, wherein said lost motion linkage comprises a first link member pivotally connected to said platform with a lower end of the first link member pivotally attached to said locking element and an upper end of the first link member attached by respective lost motion link assemblies to said first and second feeder lids.

5. The repeating trap assembly according to claim 4, wherein the upper end of said first link member comprises a pivotal coupling that connects to said lost motion link assemblies.

6. The repeating trap assembly according to claim 4, further comprising an arm extending from a scent roller that engages said first link member to cause said first link member to rotate and move said locking element when said scent roller is lifted.

7. The repeating trap assembly according to claim 1, wherein said mechanical trigger mechanism comprises a lost motion linkage that allows said first and second lids to be raised individually without tripping said trigger mechanism, while causing said trigger mechanism to be tripped when both said first and second lids are raised at the same time.

8. The repeating trap assembly according to claim 7, wherein said first feeder station is spaced from said second feeder station, and wherein said mechanical trigger mechanism requires multiple animals to be present on said trap door by requiring said first and second lids to be raised at the same time before said trigger mechanism will be tripped to release said trap floor to move from said closed position to said downwardly inclined open position to capture multiple animals at the same time.

9. The repeating trap assembly according to claim 7, further comprising at least one additional feeder station having a hopper, a trough and a lid, wherein the lid of said additional feeder station is not connected to said mechanical trigger mechanism, thereby conditioning animals to use said feeder stations without fear of being captured.

10. The repeating trap assembly according to claim 9, further comprising a bell connected to one of the feeder lids to create noise for conditioning animals not to fear metallic sounds made by the trap assembly.

11. The repeating trap assembly according to claim 7, further comprising a scent roller arranged between said first and second feeder stations, said scent roller having a structure that engages said linkage to cause said trigger mechanism to be tripped to release said trap floor to move from said closed position to said downwardly inclined open position upon an animal lifting said scent roller.

12. The repeating trap assembly according to claim 11, further comprising a dripper assembly located above said scent roller for dripping scent oil on said scent roller.

13. The repeating trap assembly according to claim 1, further comprising a spinner feeder having a feed container and a timer-controlled spinner mechanism that scatters feed at timed intervals over the trap floor and area surrounding the trap assembly to attract animals to the trap assembly.

14. The repeating trap assembly according to claim 1, further comprising a first oiler located on the platform, said first oiler comprising at least one rotating wheel that can be rotated by an animal to dispense a liquid attractant to the animal to attract animals to the trap assembly.

15. The repeating trap assembly according to claim 14, further comprising a second oiler having a lower end anchored to the ground and an upper end attached to a trailer, said second oiler comprising a plurality of cylindrical segments that can be rotated by an animal to attract animals to the trap assembly.

16. The repeating trap assembly according to claim 1, wherein said platform is supported by a wheeled trailer having a hitch at one end for towing to a trapping location.

17. The repeating trap assembly according to claim 16, further comprising a holding pen for containing animals that have fallen through the trap floor of the trap assembly.

18. A repeating trap assembly, comprising:
a trailer having a frame supported by a plurality of wheels, a hitch for attaching to a towing vehicle, and a platform;
a hinged trap floor located in the platform, said trap floor being rotatably moveable between a generally horizontal closed position and a downwardly inclined open position, said trap floor being biased toward said closed position;
a holding pen for containing animals that have fallen through the trap floor of the trap assembly;
a first feeder station positioned adjacent to said trap floor, said first feeder station comprising a first hopper for containing feed, a first trough for receiving feed from said first hopper, and a first lid covering said first trough that can be raised by an animal to access feed contained in said first trough;
a second feeder station positioned adjacent to said trap floor, said second feeder station comprising a second hopper for containing feed, a second trough for receiving feed from said second hopper, and a second lid covering said second trough that can be raised by an animal to access feed contained in said second trough; and a mechanical trigger mechanism arranged to be tripped by movement of said first and second lids for releasing said trap floor to move from said closed position to said downwardly inclined open position.

19. The repeating trap assembly according to claim 18, wherein said mechanical trigger mechanism comprises a locking element having a bevel face for engaging an edge of said trap floor as said trap floor moves from said open position to said closed position, said locking element being spring biased toward a locked position, and said bevel face being arranged to cause said locking element to move axially and reset said trigger mechanism automatically when said trap floor is moved from said open position to said closed position.

20. The repeating trap assembly according to claim 18, wherein said mechanical trigger mechanism comprises a linkage that allows said first and second lids to be raised individually without tripping said trigger mechanism, while causing said trigger mechanism to be tripped when both said first and second lids are raised at the same time.

21. The repeating trap assembly according to claim 18, further comprising a scent roller arranged between said first and second feeder stations, said scent roller having a structure that engages said linkage to cause said trigger mechanism to be tripped to release said trap floor to move from said closed position to said downwardly inclined open position upon an animal lifting said scent roller.

\* \* \* \* \*